Dec. 29, 1953
G. M. RAPATA
2,664,458
STRAIN-RELIEF GROMMET
Filed Jan. 11, 1952
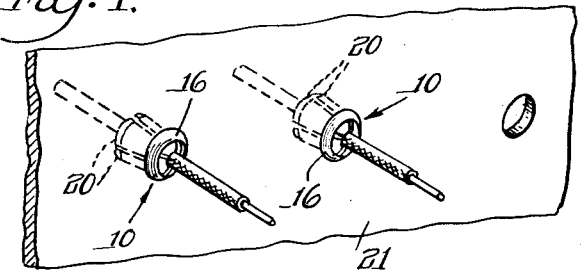
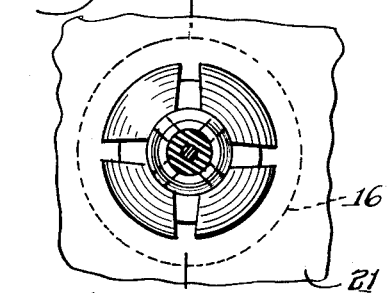
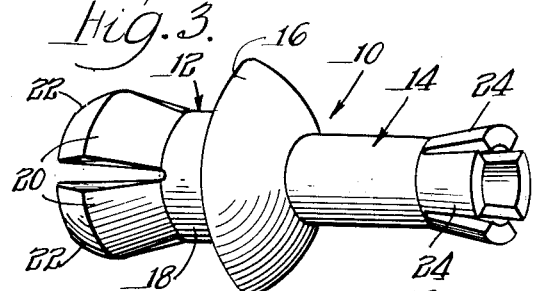
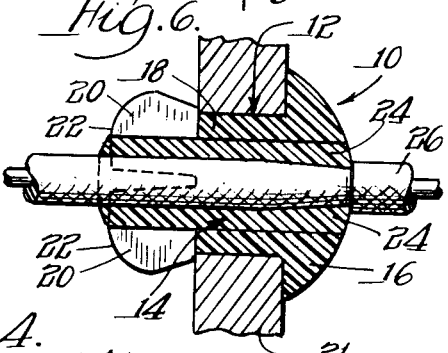
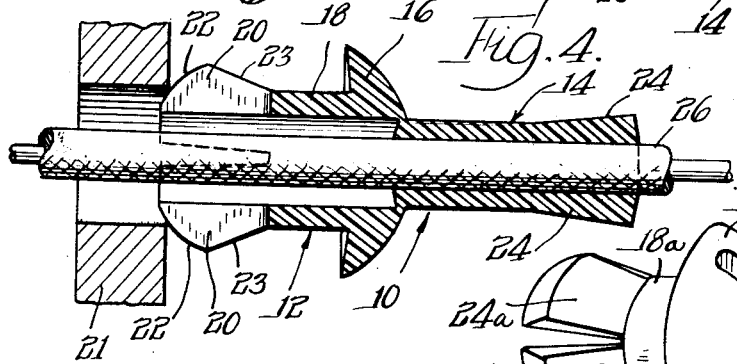
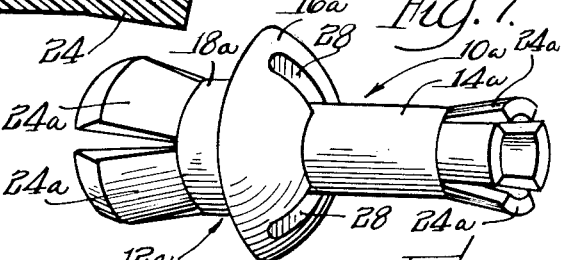
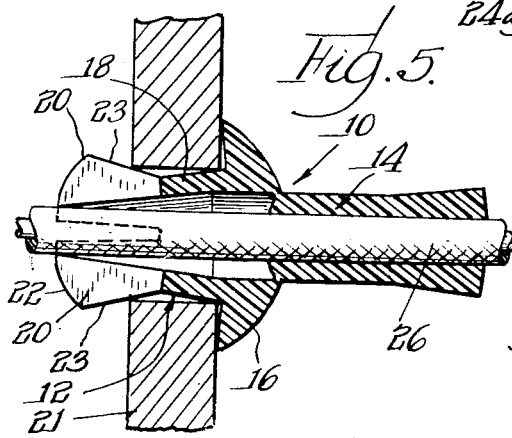
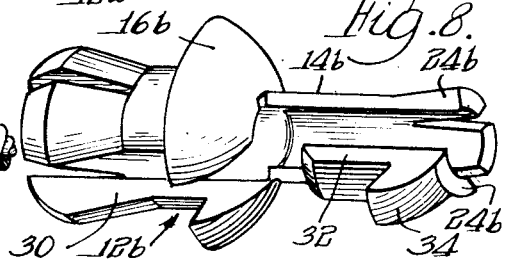
Inventor
George M. Rapata
By: Moore, Olson & Trexler attys Patented Dec. 29, 1953

2,664,458

UNITED STATES PATENT OFFICE 2,664,458

STRAIN-RELIEF GROMMET

George M. Rapata, Chicago, Ill., assignor to Illinois Tool Works, Chicago, Ill., a corporation of Illinois Application January 11, 1952, Serial No. 266,018

7 Claims. (Cl. 174—153)

This invention relates generally to strain-relief grommets and more particularly to grommets of the type made of electrically non-conductive material to support, insulate, and otherwise protect electrical conductors, rods, or tubes extending through apertured panels.

The type of strain-relief grommet or gripping insulator contemplated by this invention may be quickly and easily applied from one side of an apertured panel. The design of this fastener permits it to be preassembled on a panel and thereafter the conductor threaded through the grommet before the grommet is finally positioned relative to the panel on which it is mounted. The grommet contemplated by this invention is adapted to grippingly engage the conductor passing therethrough which eliminates movement of the electrical conductor relative to the panel as well as wear of the insulation if such is used on the conductor.

It is an important object of this invention to provide a comparatively small unitary fastener which is designed to be applied from one side of an apertured panel and grips and supports a conductor or the like in angular relation to the panel through which it passes.

It is one of the important objects of the present invention to provide a strain-relief grommet which may be preassembled within the aperture of a panel or work piece and thereafter expanded into tight fitting relation with respect to the work piece and with respect to an elongated member such, for example, as an electrical conductor extending through and projecting from opposite extremities of the grommet.

More specifically, the invention contemplates a strain-relief grommet of the type referred to above which, when it is expanded into tight fitting relation with respect to a work panel, also contracts into tight gripping relation with respect to the periphery of the elongated work part.

It is also an object of the present invention to provide a grommet or fastener as set forth above, wherein the expansion of the grommet into tight fitting relation with respect to the panel, and the contraction thereof with respect to the elongated work part or conductor, may be accomplished by a single element driven into telescopic association with a hollow rivet section.

It is another object of this invention to provide a strain-relief grommet wherein the member which grips the outer periphery of the conductor also serves as means for expanding the rivet portion of the fastener into permanently mounted position with respect to the panel.

It is still a further object of the present invention to provide a fastener of the type described which is adapted to be preassembled to an apertured panel prior to the passing of the conductor therethrough, thus enabling an operator to mount a plurality of these devices or grommets on a panel, thread wires therethrough and thereafter secure the fasteners upon the panel in gripping engagement with the conductor.

It is another object of the present invention to provide a fastener of the type described which is designed to be preassembled on a conductor or the like without first longitudinally feeding the conductor through a central passage in the fastener, and to this end the fastener is adapted to receive a conductor inserted laterally thereof.

Still another object of this invention is to provide a strain-relief grommet which, when finally mounted on an apertured work part, substantially seals the aperture into which it is inserted.

These and other objects of the invention will be more apparent from a reading of the following description and a study of the accompanying drawings, wherein—

Fig. 1 is a perspective view of a work piece or panel having strain-relief grommets of the type contemplated hereby mounted thereon;

Fig. 2 is an enlarged end view of one of the grommets as viewed from the rear of Fig. 1;

Fig. 3 is a perspective view of one form of the fastener contemplated by this invention;

Fig. 4 is a cross-sectional view of the fastener shown in Fig. 1 preassembled on an electrical conductor and ready to be mounted on an apertured work part;

Fig. 5 is a sectional view of the fastener shown in Fig. 4 after being preliminarily positioned on the apertured work piece;

Fig. 6 is a sectional view of the fastener shown in Figs. 4 and 5 in finally applied position with the stud portion of the fastener mounted in the work part and the electrical conductor grippingly engaged, said view being taken substantially along the line 6—6 of Fig. 2;

Fig. 7 shows a second embodiment of the invention wherein the grommet is provided with a resilient head member; and Fig. 8 shows still another embodiment of the invention wherein a grommet of the type contemplated by this invention is designed to accept an electrical conductor through a sidewall thereof, eliminating the necessity of threading the conductor longitudinally through the grommet member.

Referring to the drawings wherein like numerals have been used to designate similar parts in the various embodiments, the grommet device is designated generally by the numeral 10 and is comprised of a rivet section 12 and a sleeve 14. The rivet section shown in Fig. 1 of the drawings is comprised of a head 16 at one end and an integral tubular section 18 extending therefrom shaped to conform with the aperture of the panel or work piece upon which it is to be mounted. Extending from tubular section 18 are a plurality of integral resilient tongues or fingers 20 adapted to be flexed inwardly to permit the stud or shank of the rivet to be mounted on a panel or work piece 21 and shaped to grip the panel to retain the rivet section in preassembled relation with respect to the panel. Inclined surfaces 23 coact with the rivet or stud head 16 to take up variations in panel thickness when tongues 20 are expanded into fastening position, as shown in Fig. 6. The free ends of the tongues 20 are provided with cam surfaces 22 which facilitate entry of the tongues into the work aperture, as shown in Fig. 4. Also, the rounded free ends of the tongues avoid objectionable characteristics of sharp corners protruding from the panel. The rivet element 12 has a bore of substantially uniform cross-section extending throughout its entire length and adapted to accommodate the sleeve 14. It should be noted, it is contemplated that the grommet member 10 will, under most circumstances, be made of electrically non-conductive material such as nylon or other relatively soft plastic materials having some resilience. Further, it should be understood that by reason of using such soft plastic materials the aperture of a work part 21 will be substantially sealed as the tubular section 18 is seated in the aperture and the fingers 22 subsequently expanded into tight-fitting engagement relative to the wall defining the aperture (see Fig. 6). To further assure that the fastener will seal the aperture into which it is inserted, the clamping surface of the head 16 is undercut to provide flush sealing engagement of the head with the work, and thus cooperate with the aforementioned tubular section 18 and fingers 20 in assuring a satisfactory seal.

The sleeve 14, as shown in Figs. 1 to 6, inclusive, is formed integral with the rivet section 12 and is joined to the head 16 by a stock section of small cross-section which is readily fracturable when a blow is applied to the free or outer extremity of the sleeve. This outer extremity of the sleeve 14 is tapered so as to present an enlarged diameter at the free extremity. Also, this tapered portion is longitudinally split or severed so as to provide a plurality of outwardly flaring segments or fingers 24. Thus, after the rivet section 22 has been moved from the position shown in Fig. 4 to the position shown in Fig. 5 and an axial blow is imparted to the free extremity of the sleeve 14, the stock of limited cross-section between the sleeve and the head is fractured and the sleeve moves to the position shown in Fig. 6. It should be understood, of course, that prior to the axial shifting of the sleeve 14, an electrical conductor 26 or similar elongated member adapted to be mounted in position is longitudinally inserted through the central aperture of the sleeve 14 and the communicating aperture within the rivet section 12. Thus, when the sleeve 14 is driven to the position shown in Fig. 6 the inner peripheral surfaces of the fingers 24 are forced into tight impingement with the outer periphery of the conductor. In the disclosed embodiment these fingers 24 actually embed themselves within the relatively soft conductor covering, and in this manner positively secure the conductor against longitudinal shifting with respect to the rivet. The fastener, in this position, serves as a strain-relief grommet for the conductor.

In Fig. 4 the strain-relief grommet with the conductor positioned therein is shown in the position which it initially occupies just prior to the insertion of the rivet section 12 within an aperture of the work piece 21. As previously pointed out, the cam surfaces 22 at the free extremities of the resilient fingers 20 serve to direct these fingers radially inwardly as an incident to longitudinal pressure exerted against the rivet structure. Continued axial pressure causes the grommet to be moved to the position shown in Fig. 5, wherein the rivet section is now in readiness for final tightening within the work piece 21. As the sleeve 14 is subsequently driven into the rivet section, the advancing extremity of the sleeve causes the fingers 20, together with the tubular section 18 of the rivet, to be forced radially outwardly into tight impingement and sealing engagement with the wall defining the work aperture, and the undercut clamping surface of the rivet head 16 is driven into flush engagement with the work surface. In this position the grommet is firmly clamped to the work piece by the clamping surface 16 on one side and the peripheral surfaces 23 of the fingers 20 on the opposite side. As already set forth, simultaneously with the tightening of this grommet within the work piece, the conductor 26 is gripped firmly so as to prevent axial shifting thereof.

Fig. 7 discloses a further embodiment of the strain-relief grommet previously described. This grommet designated generally by the numeral 10a is similar in every respect to the previously described grommet 10 except that the head portion 16a of the rivet section 12a is provided with a plurality of radial slits or slots 28 to enhance the ability of the rivet head to collapse under the influence of axial pressure exerted thereagainst. This form of head is particularly adaptable in instances where it is desirable to cause an annular portion of the rivet head to overlie the free extremities of the sleeve fingers 24 after the sleeve has been driven into the final tightening position shown in Fig. 6. The presence of the slots 23 also facilitates inward radial movement of the head stock against the sleeve 14 in response to the final axial pressure applied to the grommet.

Fig. 8 discloses a still further embodiment of the present invention, wherein the strain-relief grommet is provided with a longitudinal side opening or recess 30 in the rivet section 12b and a longitudinal side opening or recess 32 in the sleeve 14b which communicates with, but is circumferentially disposed with respect to the side opening 30. These communicating side openings 30 and 32 permit lateral insertion of a conductor, as distinguished from the longitudinal insertion previously described in connection with the strain-relief grommets shown in Figs. 1–7, inclusive. The sleeve 14b, like the sleeves 14 and 14a, has a connection of limited cross-sectional area with the grommet head 16b. Thus, after the conductor has been laterally moved into association with the axially communicating central openings of the rivet section 12b and the sleeve 14b, axial pressure exerted against the sleeve 14b causes it to move into the rivet section, and ultimately a key 34 extending radially outwardly from one of the resilient fingers 24b moves into registration with that portion of the side opening 30 in the rivet head 16b. In this manner the key 34 serves to completely seal the rivet within the work aperture and the rivet head gives the appearance of being a complete or solid head. By having the side openings of the rivet section and sleeve circumferentially displaced from each other, the registration of these openings with each other after the parts have been driven into final tightened position is prevented. This assures trapping of the conductor or similar longitudinal element within the grommet structure. This type of strain-relief grommet is useful in applications where it is desirable to mount a fastener on a wire intermediate its ends. In other words, there are many instances where the end of the conductor is not accessible to the operator, and thus cannot be threaded through the grommet. In such instances the side opening arrangement in the grommet serves a very useful purpose.

While several embodiments of the invention have been shown, it should be understood that this invention is capable of other modifications and changes without departing from the spirit and scope of the appended claims. Thus, the invention is not limited to the specific forms illustrated herein, but should be limited only by the scope of the claims.

The invention is hereby claimed as follows:

1. A strain-relief, electrically non-conductive grommet for accommodating elongated members, such for example as electrical conductors, including a hollow rivet section consisting of a shank, a head at one extremity of said shank for engaging one side of an apertured work piece, a transversely yieldable portion at the other end of said shank adapted to be expanded into engagement with the opposite side of the aforementioned apertured work piece, and a tubular section normally projecting from the head extremity of said rivet section in position to be driven into telescopic association therewith, said tubular section normally having substantially constant internal and external diameters throughout a substantial portion of its length, the outer extremity of said tubular section flaring radially outwardly and axially severed to assure inward flexing and consequent impingement of the inner periphery thereof with a complementary elongated member as an incident to telescopic association of the rivet and tubular sections.

2. A grommet of the type described in claim 1, wherein the head of the rivet section presents an annular shoulder having its clamping surface undercut to provide a seal when the fastener is mounted on an apertured work part.

3. A grommet of the type described in claim 1, wherein the rivet and tubular sections are provided with side ports communicating with their interiors and completely traversing their longitudinal axes, the port in the tubular section being circumferentially displaced from and communicating with the port in the rivet section whereby to permit lateral insertion of an elongaged member such as an electrical conductor through said port into the interior of the rivet and tubular sections.

4. A grommet of the type described in claim 1, wherein the rivet and tubular sections are provided with side ports communicating with their interiors and completely traversing their longitudinal axes whereby to permit lateral insertion of an elongated member such as an electrical conductor through said ports into the interior of the rivet and tubular sections.

5. A grommet of the type described in claim 2, wherein the head of the rivet is recessed to assure yielding of the head and engagement of the clamping surface with a workpiece to provide a seal.

6. A strain-relief grommet for accommodating elongated members, comprising a hollow rivet section including a shank, a head at one extremity of said shank for engaging one side of an apertured workpiece, a transversely yieldable portion at the other end of said shank adapted to be expanded into engagement with the opposite side of an apertured workpiece, and a tubular section normally projecting from the head of said rivet section in position to be driven into telescopic association therewith, said rivet and tubular sections having side ports communicating with their interiors and completely traversing their longitudinal axes whereby to permit lateral insertion of an elongated member through said ports into the interior of the rivet and tubular sections.

7. A grommet as defined in claim 6, which includes a key member extending radially from the outer end of said tubular section and insertable in the portion of the side port extending through the head of the rivet section when the rivet and tubular sections are moved into telescopic relationship.

GEORGE M. RAPATA.

References Cited in the file of this patent

UNITED STATES PATENTS

| Number | Name | Date |
|---|---|---|
| 2,402,287 | Kearns | June 18, 1946 |
| 2,424,602 | De Swart | July 29, 1947 |
| 2,530,258 | Marsan | Nov. 14, 1950 |
| 2,592,130 | Erb et al. | Apr. 8, 1952 |